(12) United States Patent
Jiang

(10) Patent No.: US 9,703,389 B2
(45) Date of Patent: Jul. 11, 2017

(54) COMPUTER INPUT DEVICE

(71) Applicant: Peigen Jiang, Sammamish, WA (US)

(72) Inventor: Peigen Jiang, Sammamish, WA (US)

( * ) Notice: Subject to any disclaimer, the term of this patent is extended or adjusted under 35 U.S.C. 154(b) by 476 days.

(21) Appl. No.: 13/726,523

(22) Filed: Dec. 24, 2012

(65) Prior Publication Data

US 2014/0176435 A1 Jun. 26, 2014

(51) Int. Cl.
*G06F 3/033* (2013.01)
*G09G 5/08* (2006.01)
*G06F 3/02* (2006.01)
*G06F 3/023* (2006.01)
*G06F 3/041* (2006.01)
*G06F 3/042* (2006.01)

(52) U.S. Cl.
CPC .......... *G06F 3/0213* (2013.01); *G06F 3/0233* (2013.01); *G06F 3/0416* (2013.01); *G06F 3/0421* (2013.01)

(58) Field of Classification Search
CPC ...... G06F 3/021; G06F 3/0213; G06F 3/0227; G06F 3/0219
USPC ........................................................ 345/158
See application file for complete search history.

(56) References Cited

U.S. PATENT DOCUMENTS

| | | | | |
|---|---|---|---|---|
| 5,485,614 A | * | 1/1996 | Kocis | G06F 3/023 341/22 |
| 5,675,361 A | * | 10/1997 | Santilli | G06F 3/03547 345/156 |
| 5,707,160 A | * | 1/1998 | Bowen | 400/472 |
| 5,734,375 A | * | 3/1998 | Knox | G06F 3/0423 345/168 |
| 5,786,810 A | * | 7/1998 | Knox | G06F 3/0423 345/168 |
| 5,909,210 A | * | 6/1999 | Knox | G06F 3/0213 178/19.05 |
| 5,936,555 A | * | 8/1999 | Zagnoev | G06F 3/02 341/22 |
| 6,008,798 A | * | 12/1999 | Mato, Jr. | G06F 3/0423 345/168 |
| 6,037,882 A | * | 3/2000 | Levy | G06F 3/011 340/11.1 |
| 6,040,821 A | * | 3/2000 | Franz | G05G 9/047 345/157 |
| 6,204,839 B1 | * | 3/2001 | Mato, Jr. | G06F 1/1616 341/22 |
| 6,529,186 B1 | * | 3/2003 | Thayer | G06F 3/0338 345/156 |
| 7,023,426 B1 | * | 4/2006 | Robinson | G06F 3/0202 345/168 |

(Continued)

*Primary Examiner* — Michael J Jansen, II

(57) ABSTRACT

A computer input device is disclosed which comprised a keyboard having a plurality of keys for entering commands and characters into the computer, a touch sensor for detecting one or more touches by one or more objects on a surface area of the plurality of keys, and an input processor coupled to both the keyboard and the touch sensor, where the input processor is configured to switch the computer input device to a mouse mode when the touch sensor having detected one of the plurality of keys being touched prior to the key being pressed, and the input processor is configured to switch the computer input device to a keyboard mode when the touch sensor having detected one of the plurality of keys being touched and pressed at approximately the same starting time.

4 Claims, 4 Drawing Sheets

(56) References Cited

U.S. PATENT DOCUMENTS

| | | | | |
|---|---|---|---|---|
| 7,154,480 B2* | 12/2006 | Iesaka | | 345/173 |
| 7,274,353 B2* | 9/2007 | Chiu | | G06F 3/04886 345/156 |
| 7,903,088 B2* | 3/2011 | Kodama | | G06F 3/0213 341/21 |
| 2002/0030666 A1* | 3/2002 | Philipp | | G06F 3/0213 345/168 |
| 2002/0135564 A1* | 9/2002 | Abe | | G06F 3/0202 345/168 |
| 2003/0001822 A1* | 1/2003 | Davidson | | G06F 3/0213 345/168 |
| 2003/0090394 A1* | 5/2003 | Zagnoev | | G06F 3/0213 341/22 |
| 2003/0174125 A1* | 9/2003 | Torunoglu | | G06K 9/224 345/168 |
| 2003/0201971 A1* | 10/2003 | Iesaka | | 345/156 |
| 2003/0201982 A1* | 10/2003 | Iesaka | | 345/168 |
| 2004/0041791 A1* | 3/2004 | Dunker | | G06F 3/0202 345/168 |
| 2004/0125147 A1* | 7/2004 | Liu et al. | | 345/773 |
| 2005/0057522 A1* | 3/2005 | Godler | | G06F 3/0421 345/173 |
| 2006/0082548 A1* | 4/2006 | Kodama | | G06F 3/0213 345/157 |
| 2006/0232557 A1* | 10/2006 | Fallot-Burghardt | | G06F 3/011 345/168 |
| 2007/0091070 A1* | 4/2007 | Larsen et al. | | 345/168 |
| 2009/0008161 A1* | 1/2009 | Jones | | G06F 3/044 178/18.06 |
| 2010/0148995 A1* | 6/2010 | Elias | | 341/22 |
| 2010/0149099 A1* | 6/2010 | Elias | | 345/168 |
| 2011/0006991 A1* | 1/2011 | Elias | | 345/168 |
| 2011/0291940 A1* | 12/2011 | Ghassabian | | G06F 1/1626 345/169 |
| 2012/0086642 A1* | 4/2012 | Weihe | | G06F 3/0202 345/168 |
| 2012/0274567 A1* | 11/2012 | Suggs | | 345/168 |
| 2013/0050092 A1* | 2/2013 | Ivanov | | G06F 3/017 345/168 |
| 2013/0063285 A1* | 3/2013 | Elias | | G06F 3/0213 341/33 |
| 2013/0106700 A1* | 5/2013 | Sugiura et al. | | 345/168 |
| 2013/0169534 A1* | 7/2013 | Jiang | | G06F 3/0213 345/158 |
| 2013/0257734 A1* | 10/2013 | Marti et al. | | 345/168 |

* cited by examiner

COMPUTER INPUT DEVICE

BACKGROUND

The present invention relates generally to human input devices for computing systems, and, more particularly, to a computer keyboard and mouse combo device.

A most popular way to position a cursor on a computer display is to use a mouse, which functions by detecting two dimensional motions relative to its supporting surface. Physically, a mouse comprises an object held under one of a user's hands, with one or more buttons. Clicking or hovering (stopping movement while the cursor is within the bounds of an area) can select files, programs or actions from a list of names, or (in graphical interfaces) through small images called "icons" and other elements. For example, a text file might be represented by a picture of a paper notebook, and clicking while the cursor hovers over this icon might cause a text editing program to open the file in a window.

When mice have more than one button, software may assign different functions to each button. Often, a primary (leftmost in a right-handed configuration) button on the mouse will select items (primary click), and a secondary (rightmost in a right-handed) button will bring up a menu of alternative actions applicable to that item (secondary click).

A conventional keyboard can detect a pressing of any key thereof, but cannot detect merely touches on the keys. Here, the "touch" refers to a surface of the keyboard being contacted by an object regardless if the key is pressed or not. If the conventional keyboard is a tactile one, the key pressing results from the key being depressed. If the conventional keyboard is a surface one, such as Touch Cover for Microsoft Surface, the key pressing results from a force being applied on the key. As long as the key remains depressed in tactile keyboard or forced upon in surface keyboard, the key is pressed.

While conventional mice can be highly accurate pointing devices for computers, being a separate device the conventional mice have some short-comings, such as every time when a computer user wants to move a cursor, he or she has to move his or her hand away from the keyboard and to the mouse, and move the mouse as a physical object. It is not only less efficient but also may cause injury to the hand over an extended period of time of use.

As such, what is desired is a computer input device, particularly a pointing device that does not rely on moving any additional object other than the user's fingers.

SUMMARY

A computer input device is disclosed which comprised a keyboard having a plurality of keys for entering commands and characters into the computer, a touch sensor for detecting one or more touches by one or more objects on a surface area of the plurality of keys, and an input processor coupled to both the keyboard and the touch sensor, where the input processor is configured to switch the computer input device to a mouse mode when the touch sensor having detected one of the plurality of keys being touched prior to the key being pressed, and the input processor is configured to switch the computer input device to a keyboard mode when the touch sensor having detected one of the plurality of keys being touched and pressed at approximately the same starting time.

The construction and method of operation of the invention, however, together with additional objects and advantages thereof, will be best understood from the following description of specific embodiments when read in connection with the accompanying drawings.

Figure 1:
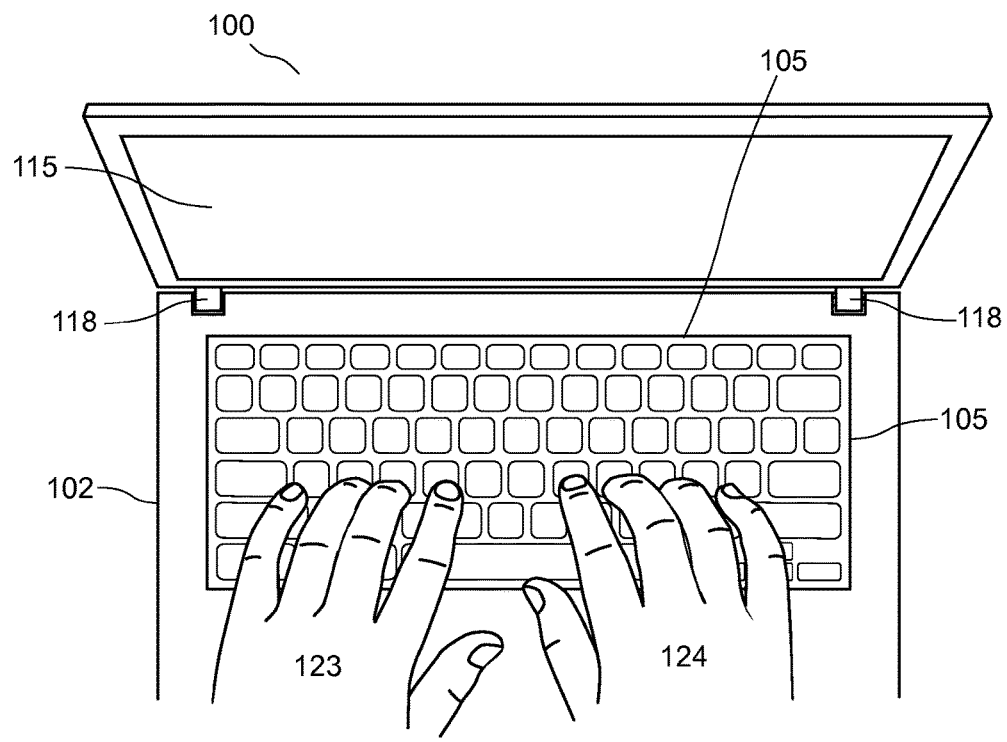
FIG. 1 is a perspective view of a laptop computer with a keyboard.

The drawings accompanying and forming part of this specification are included to depict certain aspects of the invention. A clearer conception of the invention, and of the components and operation of systems provided with the invention, will become more readily apparent by referring to the exemplary, and therefore non-limiting, embodiments illustrated in the drawings, wherein like reference numbers (if they occur in more than one view) designate the same elements. The invention may be better understood by reference to one or more of these drawings in combination with the description presented herein.

DESCRIPTION

The present invention relates to a computer input device utilizing a touch sensing device and a conventional keyboard to provide cursor input for the computer. A preferred embodiment of the present invention will be described hereinafter with reference to the attached drawings.

FIG. 1 is a perspective view of a laptop computer 100 with a conventional keyboard 105 for entering text, etc. The laptop computer 100 has a base unit 102 containing the keyboard 105, and a display panel 115 which is hinged to the base unit 102 by hinges 118. A skilled computer user can generally type on the keyboard 105 with both hands 123 and 124.

Figure 2:
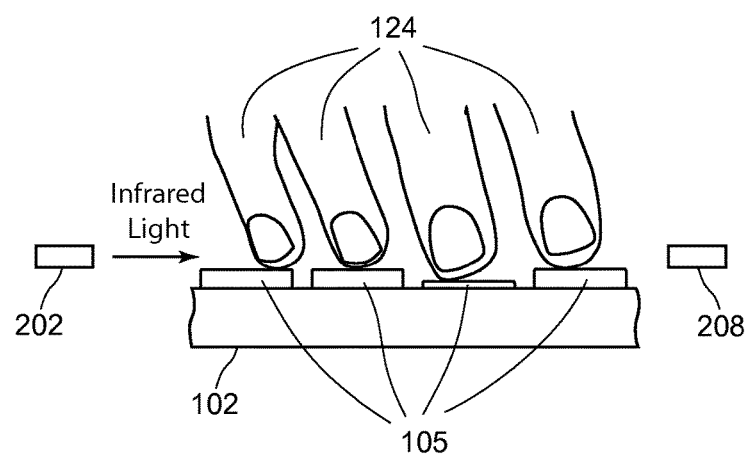
FIG. 2 illustrates an infrared-light touch sensing system positioned to detect touch on the keyboard surface according to an embodiment of the present invention.

FIG. 2 illustrates an infrared-light touch sensing system positioned to detect touches on the surface of the keyboard 105 according to an embodiment of the present invention. The infrared-light touch sensing system includes an infrared light emitter 202 and an infrared light receiver 208. The infrared light travels across the surface of the keyboard 105. A finger 124 or any other object touching the surface of the keyboard 105 blocks the infrared light from being received by the infrared light receiver 208. As a result, the touch can be detected.

Referring back to FIG. 1, the infrared light emitter 202 can be positioned along one edge of the keyboard 105 and the infrared light receiver 208 can be positioned along the opposite edge of the keyboard 105. In order to obtain coordinates of a touch, two sets of the infrared light touch sensors will be needed with one set positioned on the horizontal edges and the other on the vertical edges.

Although an infrared-light touch sensing system is described hereinbefore, other touch sensing systems, such as the one using a video camera or ultrasound can also be used.

Figure 3:
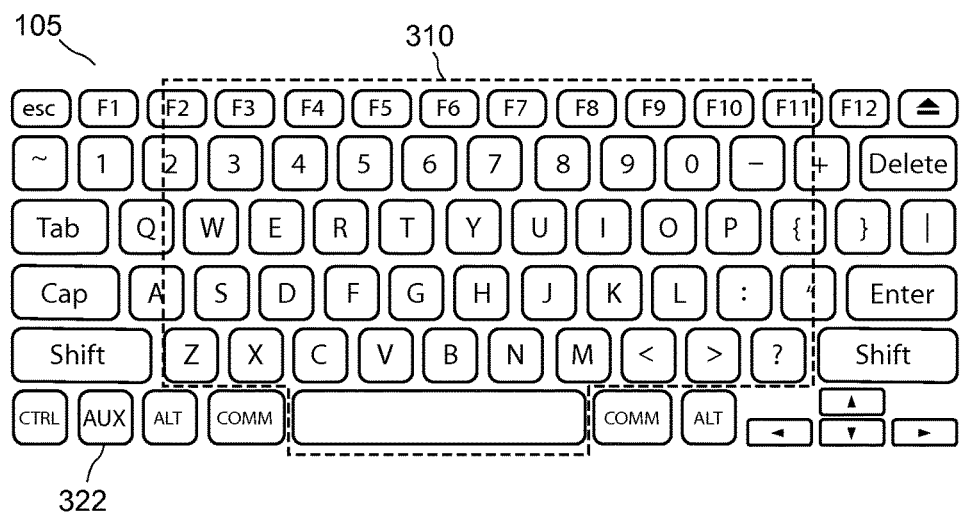
FIG. 3 is a layout diagram of keyboard keys according to the embodiment of the present invention.

FIG. 3 is a layout diagram of keys of the keyboard 105 according to the embodiment of the present invention. A predetermined touch sensing area 310 is designated by a keyboard-mouse combo (KMC) software for detecting a touch and extracting coordinates of the touch. Only touches within the touch sensing area 310 can be detected as effective touches by the touch sensing system. The predetermined touch sensing area 310 can also be marked out on the surface of the keyboard 105, so that a computer user can clearly identify a boundary of the touching sensing area. The predetermined touch sensing area 310 functions akin to Apple's Magic Trackpad surface area. Apparently, the touch sensing area 310 has to be entirely covered by infrared light. Even though a touch on areas outside of the predetermined touch sensing area 310 can be picked up by the infrared-light sensing system, the KMC software ignores such touch.

Figure 5:
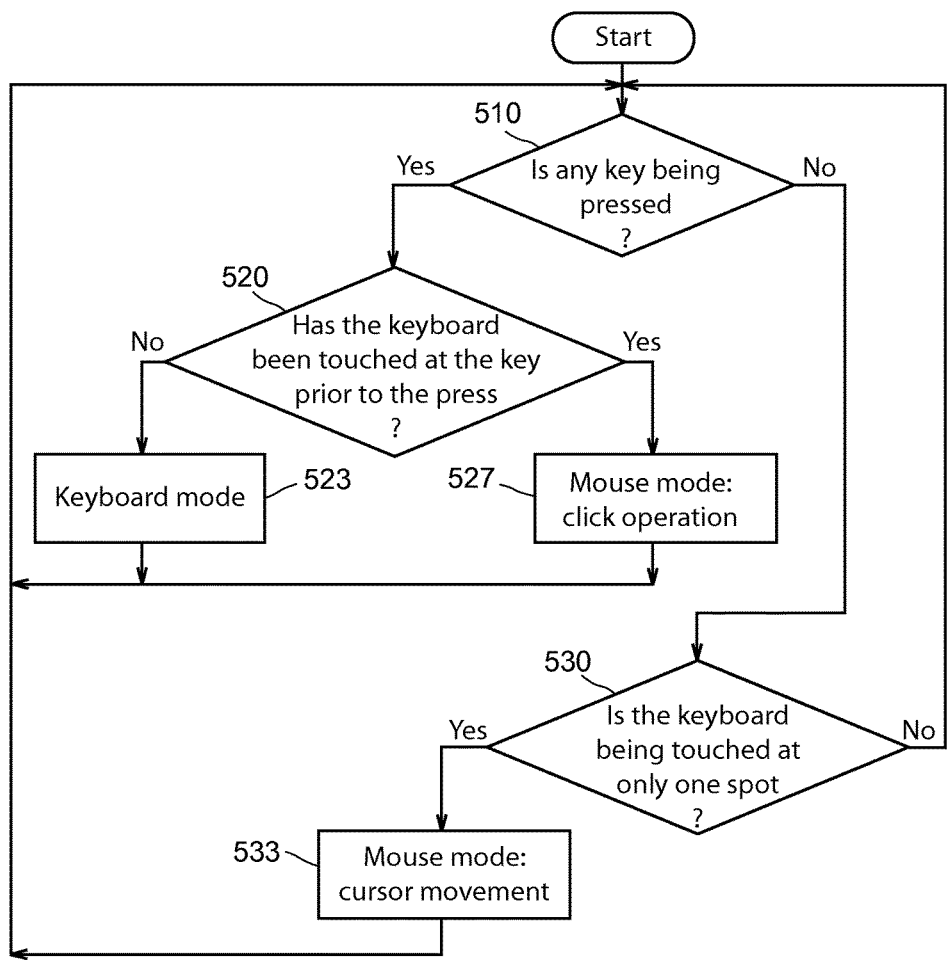
FIG. 5 is a flow chart diagram illustrating steps of operations of the keyboard-mouse combo device of the embodiment of the present invention.

Referring again to FIG. 3, there is a designated key 322 marked as "AUX" which stands for "auxiliary", outside of the predetermined touch sensing area 310. A main function of the "AUX" key 322 is for switching between a primary click and a secondary click. Operation details of the "AUX" key 322 are depicted in FIG. 5 and associated paragraphs hereinafter. Although only one "AUX" key 322 on the left hand side of the keyboard 105 is illustrated in FIG. 3, a skilled in the art would realize that another "AUX" key can be designated on the right hand side of the keyboard 105 as well.

Figure 4:
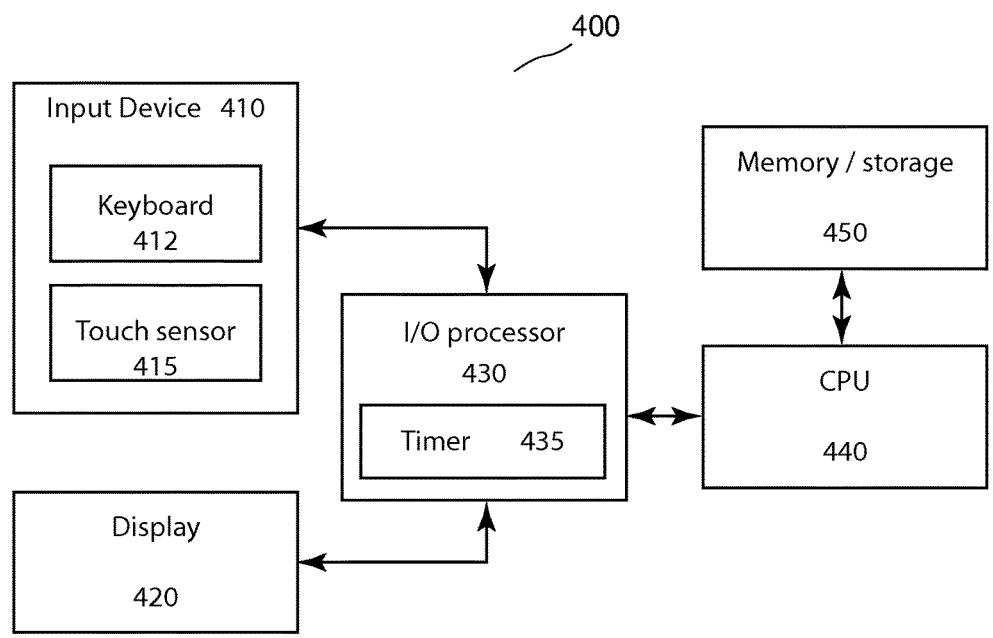
FIG. 4 is a block diagram of a computing system with a keyboard-mouse combo device according to the embodiment of present invention.

FIG. 4 is a block diagram of a computing system 400 with a KMC device according to the embodiment of present invention. The computing system 400 includes an input device 410, a display 420, an input/output (I/O) processor 430, a central processing unit (CPU) 440 and a memory and storage unit 450. The input device 410 comprises a conventional keyboard 412 and a touch sensor 415 which overlays the conventional keyboard 410 as described in FIGS. 1-3. The conventional keyboard 412 and the touch sensor 415 form the KMC device. The I/O processor 430 is the hardware that executes the KMC software. The I/O processor 430 also includes a timer 435 to measure a length of elapsed time when a surface of the keyboard 412 is continuously touched by a single object until the touched key is pressed.

FIG. 5 is a flow chart diagram illustrating steps of an operation of the KMC device of the embodiment of the present invention. The keyboard-mouse operation starts with checking if any key is pressed in step 510. In case there are at least one key is pressed and at least one key is touched at the same time, the keyboard will enter into the keyboard mode in which the KMC device works as a conventional keyboard, i.e., when a key is pressed, a character the key is designated for will be entered into the computer. In case there is only one key is pressed and no other key is touched, the KMC software will check in step 520 if the key surface has been touched at approximately the same location of the key that is being pressed prior to the pressing. When a key is pressed, the key surface will inevitably been touched as well. However, in a quick stroke such as when people using one finger to enter a character, the start of a key press and the key surface touch occur substantially at the same time. The KMC software may set a predetermined length of time such as 100 millisecond as a threshold to determine if the touch has occurred prior to or at the same time as the start of the press.

Referring to FIG. 5 again, in case the KMC device has not been touched, either at the key that is pressed or elsewhere, prior to the pressing, the KMC software enters the keyboard mode in step 523. In case the KMC device has been touched at the location of the key that is being pressed prior to the pressing, the KMC software will enter into a mouse mode in step 527, and treats the key press as a mouse click.

Referring to FIG. 5 again, in case there is neither a key being pressed nor a key being touched, the KMC software will keep detecting such actions in steps 510 and 530. In case the key surface is touched only at one spot without a key being pressed, the KMC software will enter into a mouse mode in step 533, and treats the touch as a trigger of a cursor movement.

Figure 6:
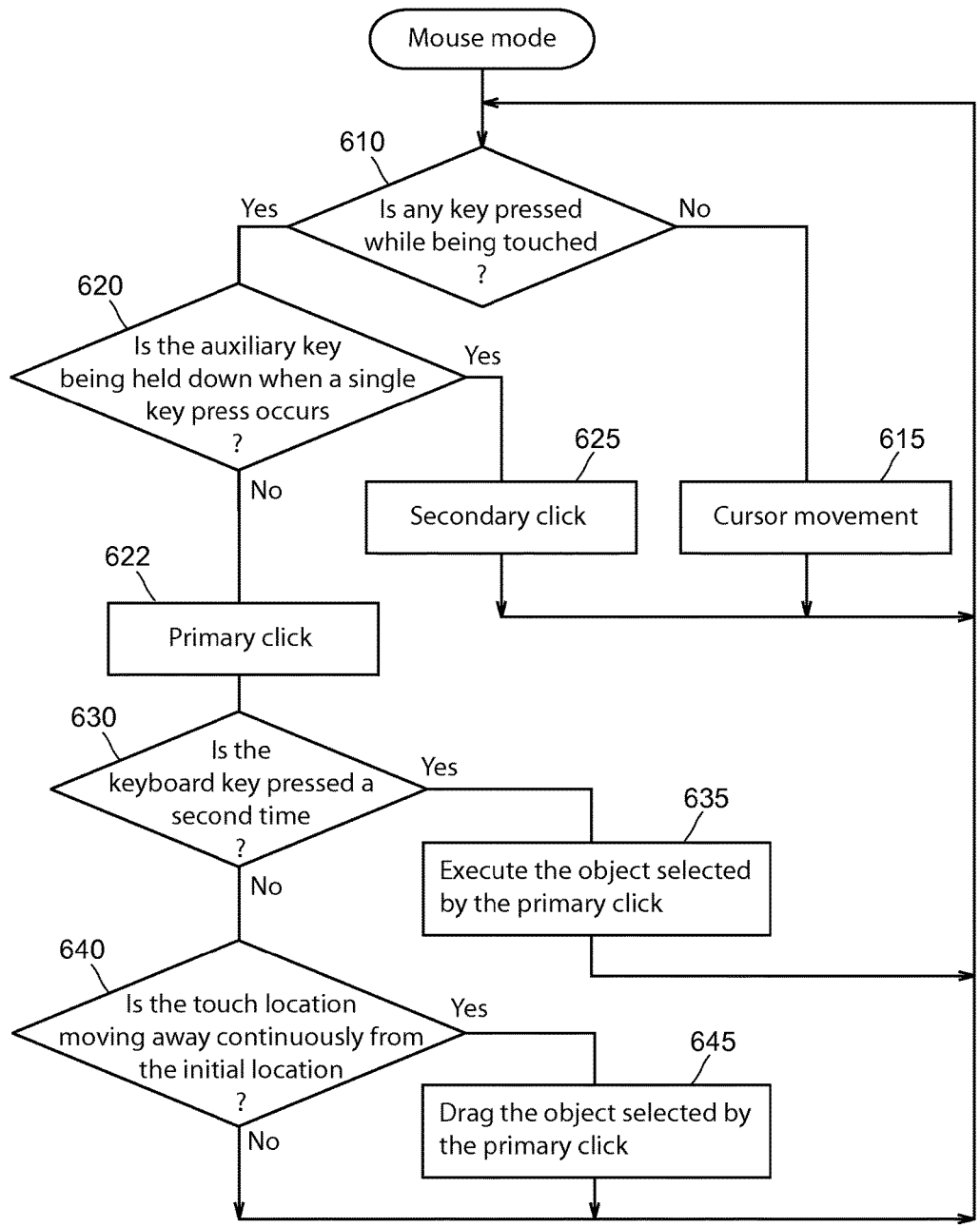
FIG. 6 is a flow chart diagram illustrating steps of mouse mode operations of the keyboard-mouse combo device of the embodiment of the present invention.

FIG. 6 is a flow chart diagram illustrating steps of mouse mode operations of the KMC device of the embodiment of the present invention. When the key surface of the KMC device is touched by only one object, the KMC device enters into the mouse mode operation. In step 610 of the mouse mode, the KMC device first detects if there is any key that is pressed while being touched. In case there is no key is pressed, the KMC device treats the single-location touch as an operation equivalent to the conventional mouse's cursor movement in step 615. In case there is a single key being pressed, the KMC device further detects if the auxiliary key is held down when the single key press occurs in step 620. In case the auxiliary key is held down when the single key press occurs, the KMC device treats the operation equivalent to the conventional mouse's secondary click in step 625. In case the auxiliary key is not held down when the single key press occurs, the KMC device treats the operation equivalent to the conventional mouse's primary click in step 622. The KMC device further checks if the same key is pressed a second time within a predetermined length of time in step 630. If the checking result is positive, the KMC device executes the object selected by the primary click in step 635. If the checking result is negative, the KMC device does not take any action but goes on to check if the touch location is moving away continuously from the initial touch location in step 640. In case the touch location moves away from the initial location continuously, the KMC device treats the touch location's movement as equivalent to the conventional mouse's dragging the object selected by the primary click. In other words, if a finger after pressing a key which results in selecting an object, maintains contact with the key surface while sliding away from the initial pressing location, the finger drags the selected object to locations following the finger's sliding. The fingers can either keep pressing keys while sliding across the same or merely maintain surface contacts with the keys without pressing, the KMC device treats the two situations the same as the dragging operation. When the finger leaves the key surface, the dragging operation will end but the selected object will remain being selected until next primary click.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A computer input device comprising:
 a keyboard having a plurality of keys for entering commands and characters into the computer input device;
 a touch sensor for detecting a touch by an object on a surface area of the plurality of keys; and
 an input processor coupled to both the keyboard and the touch sensor and configured to compare timing of a key press on any of the plurality of keys within the touch sensing surface area with timing of a touch on the touch sensing surface area for making mode switching decisions, the input processor configured to switch the computer input device to a mouse mode when the touch occurs prior to the key press, the input processor configured to switch the computer input device to a keyboard mode when the touch and the key press occur at approximately the same starting time,
 wherein the input processor stores a predetermined length of time and has a timer to measure a length of elapsed time when one of the plurality of keys is continuously touched by a single object until the touched keys are pressed, and the input processor decides whether or not the key touch is prior to the key press by comparing the measured length of elapsed time with the stored predetermined length of time.

2. A computer input device comprising:
 a keyboard having a plurality of keys for entering commands and characters into the computer input device;
 a touch sensor for detecting a touch by an object on a surface area of the plurality of keys; and
 an input processor coupled to both the keyboard and the touch sensor and configured to compare timing of a key press on any of the plurality of keys within the touch sensing surface area with timing of a touch on the touch sensing surface area for making mode switching decisions, the input processor configured to switch the computer input device to a mouse mode when the touch occurs prior to the key press, the input processor configured to switch the computer input device to a keyboard mode when the touch and the key press occur at approximately the same starting time,
 wherein the input processor is configured to convey a primary click operation to the computer when one or more of the plurality of keys are pressed in the mouse mode.

3. A computer input device comprising:
 a keyboard having a plurality of keys for entering commands and characters into the computer input device, the keyboard having a designated surface area overlaying the plurality of keys for touch sensing, at least one of the plurality of keys being located outside of the designated surface area;
 a touch sensor for detecting a touch by an object on the designated surface area of the keyboard; and
 an input processor coupled to both the keyboard and the touch sensor and configured to compare timing of a key press on any of the plurality of keys within the touch sensing surface area with timing of a touch on the touch sensing surface area for making mode switching decisions, the input processor configured to switch the computer input device to a mouse mode when the touch occurs prior to the key press, the input processor configured to switch the computer input device to a keyboard mode when the touch and the key press occur at approximately the same starting time,
 wherein the input processor stores a predetermined length of time and has a timer to measure a length of elapsed time when one of the plurality of keys is continuously touched by a single object until the touched keys are pressed, and the input processor decides whether or not the key touch is prior to the key press by comparing the measured length of elapsed time with the stored predetermined length of time.

4. A computer input device comprising:
 a keyboard having a plurality of keys for entering commands and characters into the computer input device, the keyboard having a designated surface area overlaying the plurality of keys for touch sensing, at least one of the plurality of keys being located outside of the designated surface area;
 a touch sensor for detecting a touch by an object on the designated surface area of the keyboard; and
 an input processor coupled to both the keyboard and the touch sensor and configured to compare timing of a key press on any of the plurality of keys within the touch sensing surface area with timing of a touch on the touch sensing surface area for making mode switching decisions, the input processor configured to switch the computer input device to a mouse mode when the touch occurs prior to the key press, the input processor configured to switch the computer input device to a keyboard mode when the touch and the key press occur at approximately the same starting time,
 wherein the input processor is configured to convey a primary click operation to the computer when one or more of the plurality of keys within the designated surface area are pressed in the mouse mode.

\* \* \* \* \*